US008254102B2

(12) United States Patent
Ye

(10) Patent No.: US 8,254,102 B2
(45) Date of Patent: Aug. 28, 2012

(54) MOUNTING APPARATUS FOR SPEAKER

(75) Inventor: Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 266 days.

(21) Appl. No.: 12/830,487

(22) Filed: Jul. 6, 2010

(65) Prior Publication Data

US 2011/0242738 A1 Oct. 6, 2011

(30) Foreign Application Priority Data

Apr. 1, 2010 (CN) .......................... 2010 1 0137398

(51) Int. Cl.
*G06F 1/16* (2006.01)
*H04R 1/02* (2006.01)

(52) U.S. Cl. .................... 361/679.23; 381/386; 381/388

(58) Field of Classification Search ........... 361/679.01–679.45, 679.55–679.59; 381/386, 388

See application file for complete search history.

(56) References Cited

U.S. PATENT DOCUMENTS

| | | | | | |
|---|---|---|---|---|---|
| 5,838,537 | A * | 11/1998 | Lundgren et al. | ........ | 361/679.27 |
| 5,947,434 | A * | 9/1999 | Kosmoski et al. | ......... | 248/298.1 |
| 6,100,942 | A * | 8/2000 | Hollenbaugh et al. | ........ | 348/836 |
| 6,181,550 | B1 * | 1/2001 | Kim | ........................ | 361/679.06 |
| 6,527,237 | B2 * | 3/2003 | Harary et al. | ............ | 248/221.11 |
| 6,794,798 | B2 * | 9/2004 | Watanabe et al. | ............. | 310/334 |
| 6,999,595 | B2 * | 2/2006 | Anderson et al. | ............. | 381/333 |
| 7,035,086 | B2 * | 4/2006 | Williams et al. | .............. | 361/679 |
| 7,140,584 | B2 * | 11/2006 | Bourque et al. | ........... | 248/274.1 |
| 2008/0304693 | A1 * | 12/2008 | Lau | ............................... | 381/388 |
| 2009/0285438 | A1 * | 11/2009 | Liou et al. | ..................... | 381/388 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A mounting apparatus includes a case, a first sliding member, a second sliding member, a first supporting member, and a second supporting member. The first sliding member is slidably received in the case. The second sliding member is slidably received in the first sliding member. The first supporting member is rotatably connected to the second sliding member. The second supporting member is rotatably connected to the second supporting member and configured for positioning a speaker.

14 Claims, 8 Drawing Sheets

MOUNTING APPARATUS FOR SPEAKER

BACKGROUND

1. Technical Field

The present disclosure relates to a mounting apparatus for securing a speaker.

2. Description of Related Art

A speaker is usually placed on/under a desk taking up space that may be precious and useful for other things.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
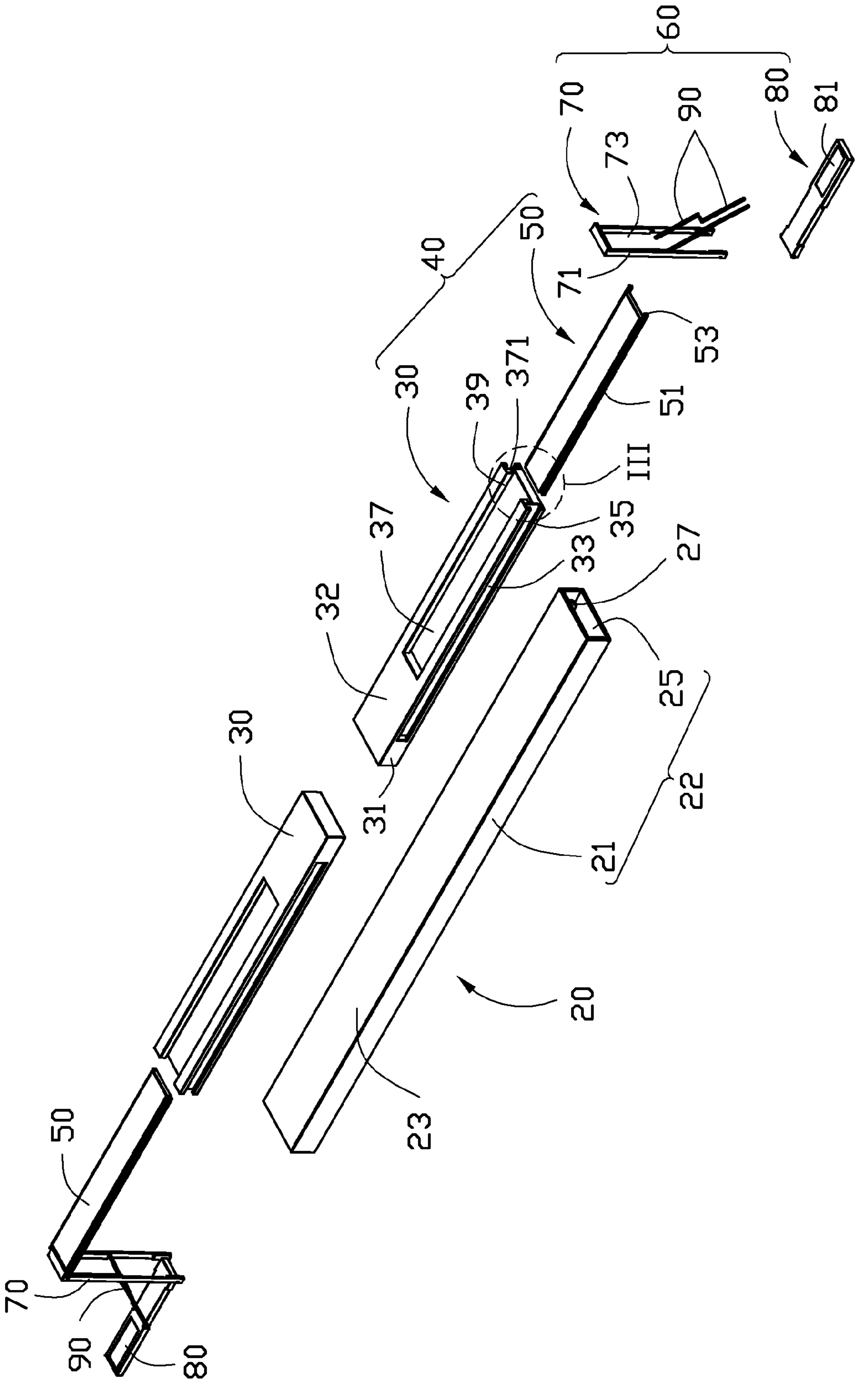
FIG. 1 is an exploded view of a mounting apparatus in accordance with one embodiment.

Referring to FIG. 1, a mounting apparatus in accordance one embodiment includes a case 20, two first sliding members 30, two second sliding members 50, and two supporting mechanisms 60.

Figure 2:
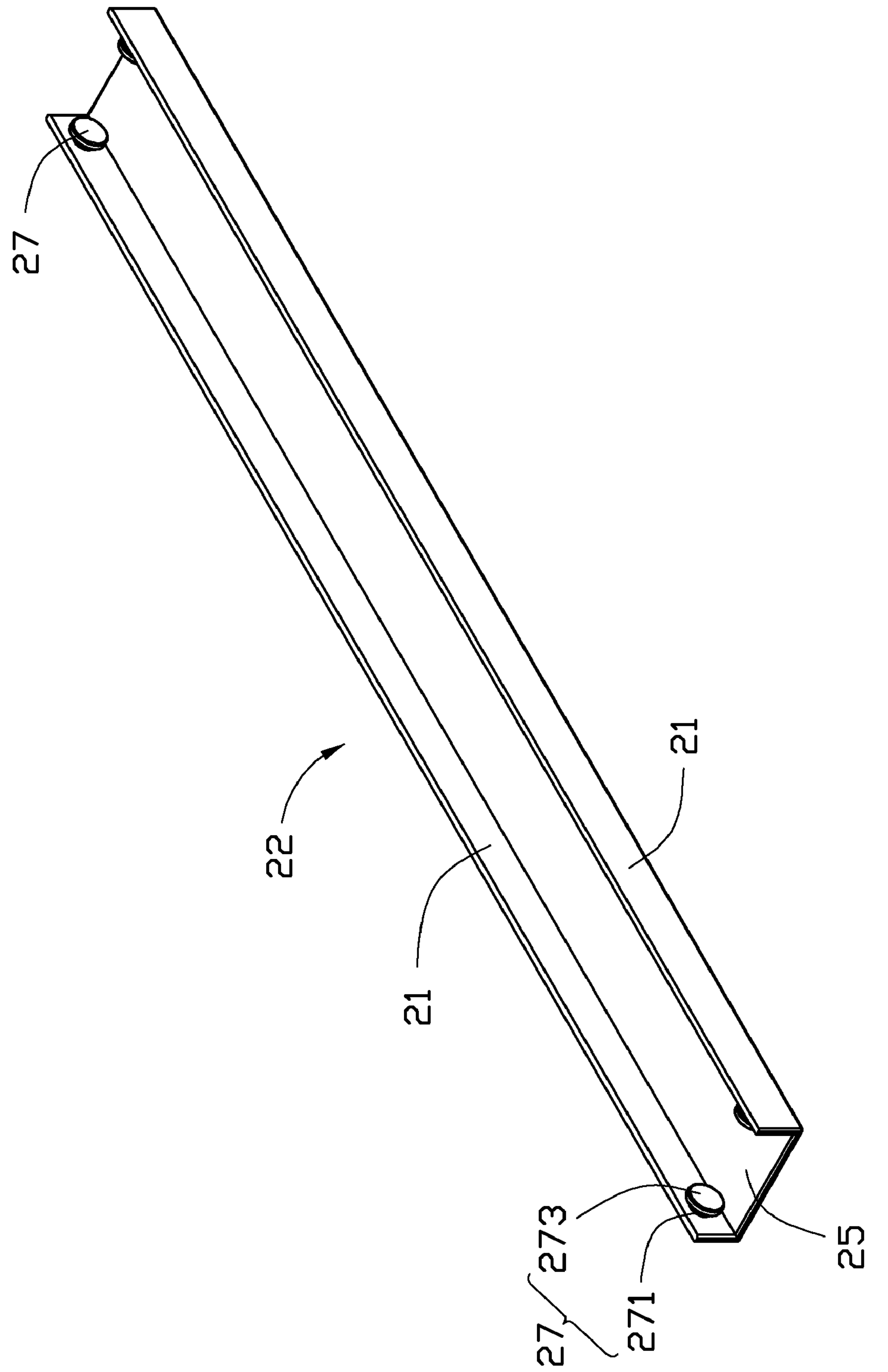
FIG. 2 is isometric view of a base of a case FIG. 1.
Figure 3:
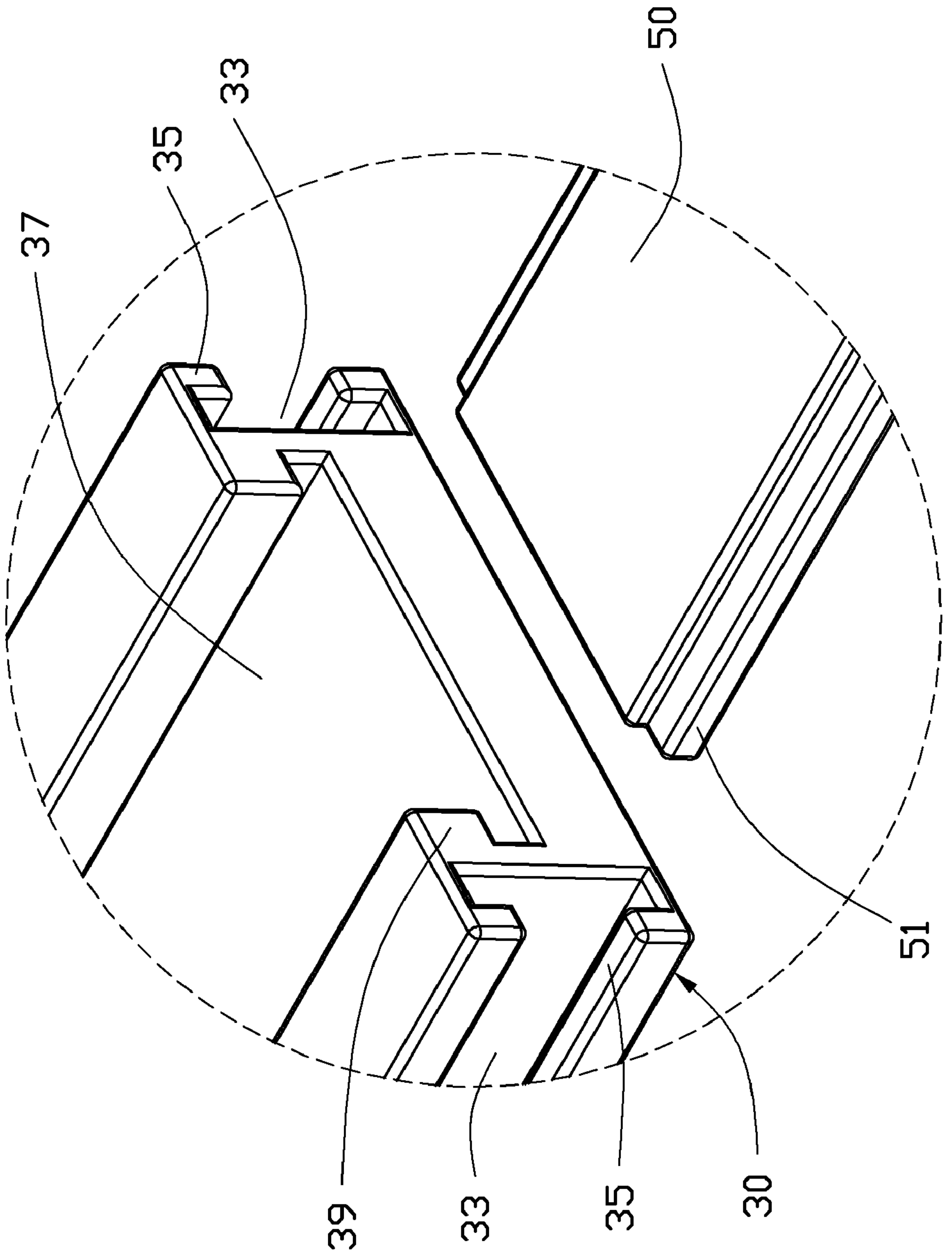
FIG. 3 is an enlarged view of portion III of FIG. 1.

The case 20 includes a base 22 and a cover 23 secured to the base 22. The base 22 includes a bottom plate 25 and two opposite side plates 21, connected to the bottom plate 25. In one embodiment, the opposite side plates 21 are parallel to each other and perpendicular to the bottom plate 25. Referring to FIG. 2, two positioning posts 27 are located on an inner surface of each side plate 21 and are adjacent two opposite ends of each side plate 21. Each positioning post 27 includes a head 273, and a neck 271 connected to the corresponding side plate 21. A diameter of each head 273 is smaller than that of the corresponding neck 271.

Referring to FIG. 1, each first sliding member 30 is slidably installed into the case 20 and includes a top wall 32 and two opposite sidewalls 31. In one embodiment, the sidewalls 31 are parallel to each other and perpendicular to the top wall 32. The top wall 32 defines a first sliding slot 37, and two positioning flanges 39 are located on opposite edges of the first sliding slot 37. Each sidewall 31 defines a second sliding slot 33 for receiving the corresponding positioning posts 27 of the case 20. Two limiting flanges 35 are located on opposite edges of each second sliding slot 33. A distance between the two limiting flanges 35 of each second sliding slot 33 is greater the diameter of the neck 271 of each positioning post 27, but less than the diameter of the head 273 of each positioning post 27.

Each second sliding member 50 defines two third sliding slots at each side for receiving the two limiting flanges 35. Two sliding flanges 51 are located on opposite elongated sides of each second sliding member 50. Two pivot portions 53 are located at one end of each second sliding member 50.

Each supporting mechanism 60 includes a first supporting member 70, two connecting members 90, and a second supporting member 80. Each first supporting member 70 includes a shaft 72 and two arms 71 connecting with the shaft 72. A space is defined among the shaft 72 and the arms 71. One end of each first supporting member 70 is capable of rotatably connecting with the pivot portions 53 of each second sliding member 50. One end of each second supporting member 80 is capable of rotatably connecting with the other end of each first supporting member 70. A recess 81 is defined in each second supporting member 80 adjacent the other end of each second supporting member 80. Each two connecting members 90 are capable of connecting each first supporting member 70 and each second supporting member 80. The second supporting members 80 and the connecting members 90 are configured to be received in the spaces 73 of the first supporting members 70, respectively.

Referring to FIGS. 1-4, in assembly, the first sliding members 30 are inserted into the case 20, and the positioning posts 27 are received in the second sliding slots 33. The necks 271 are positioned between the limiting flanges 35, and the heads 273 are blocked by the limiting flanges 35 in the second sliding slots 33. Therefore, the positioning posts 27 are capable of sliding in the second sliding slots 33. The sliding flanges 51 of the second sliding members 50 are inserted in the first sliding slots 37 of the first sliding members 30. The positioning flanges 39 of the first sliding members 30 block the sliding flanges 51 in the first sliding slots 37, to order sliding direction of the sliding flanges 51 along the first sliding slots 37. The first supporting members 70 are rotatably connected to the second sliding members 50. The second supporting members 80 are rotatably secured to the first supporting members 70. Each two connecting members 90 are rotatably secured to the arms 73 of each first supporting member 70 and opposite sides of each second supporting member 80 (shown in FIG. 3).

Figure 4:
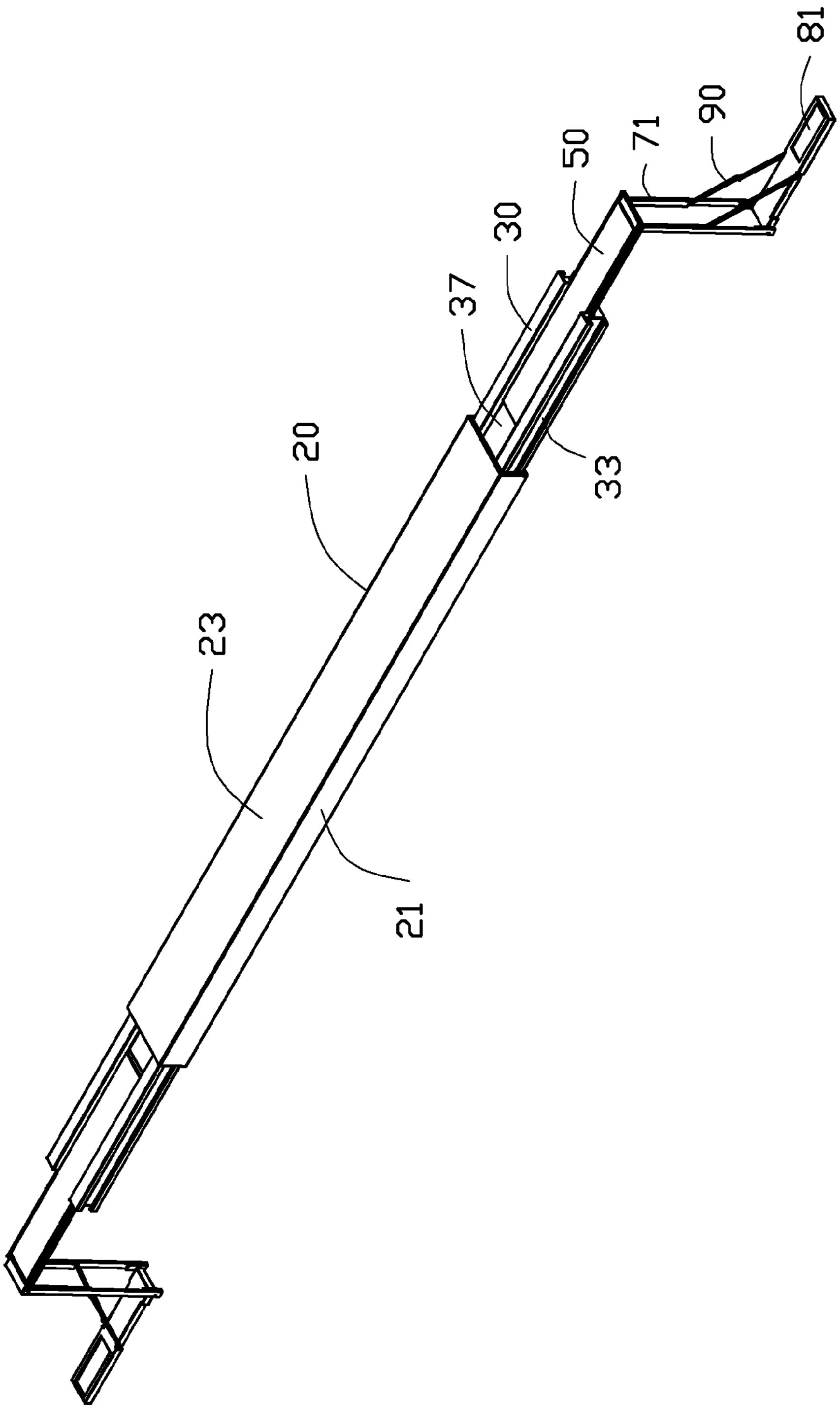
FIG. 4 is an assembled view of the mounting apparatus of FIG. 1.
Figure 5:
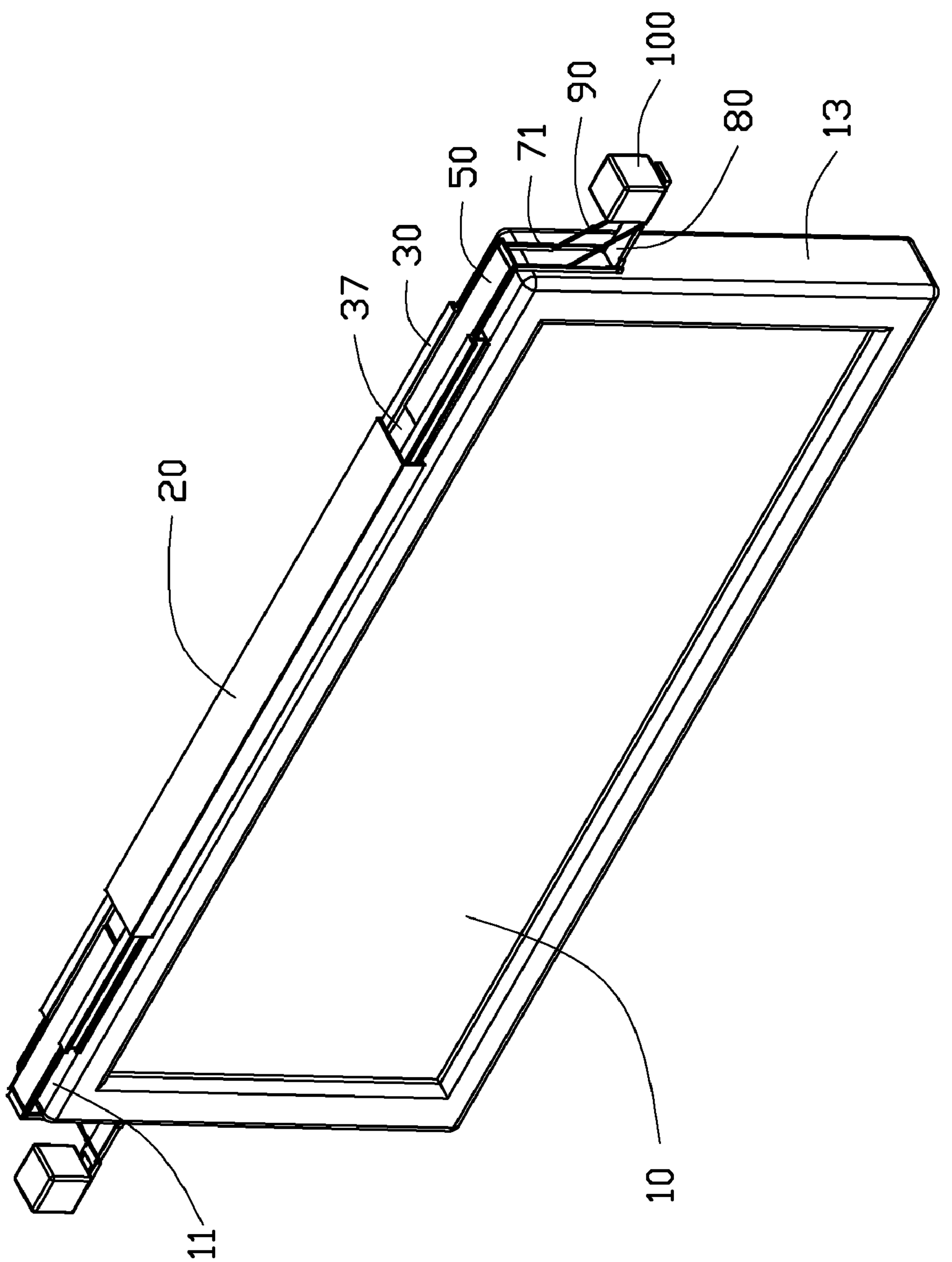
FIG. 5 is an assembled view of the mounting apparatus of FIG. 4, a display, and two speakers.
Figure 6:
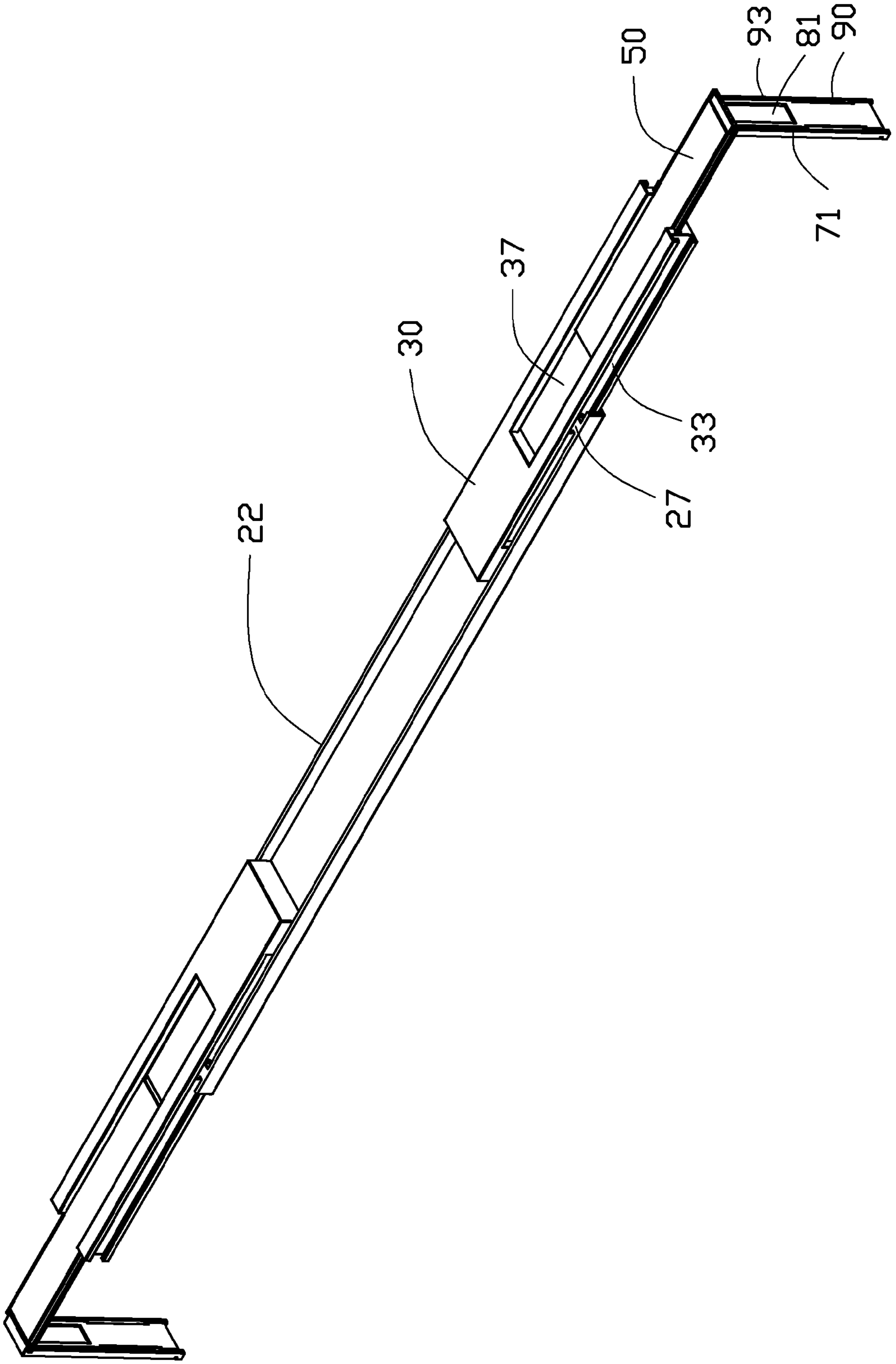
FIG. 6 is similar to FIG. 4, but shows the second supporting members in a different position.
Figure 7:
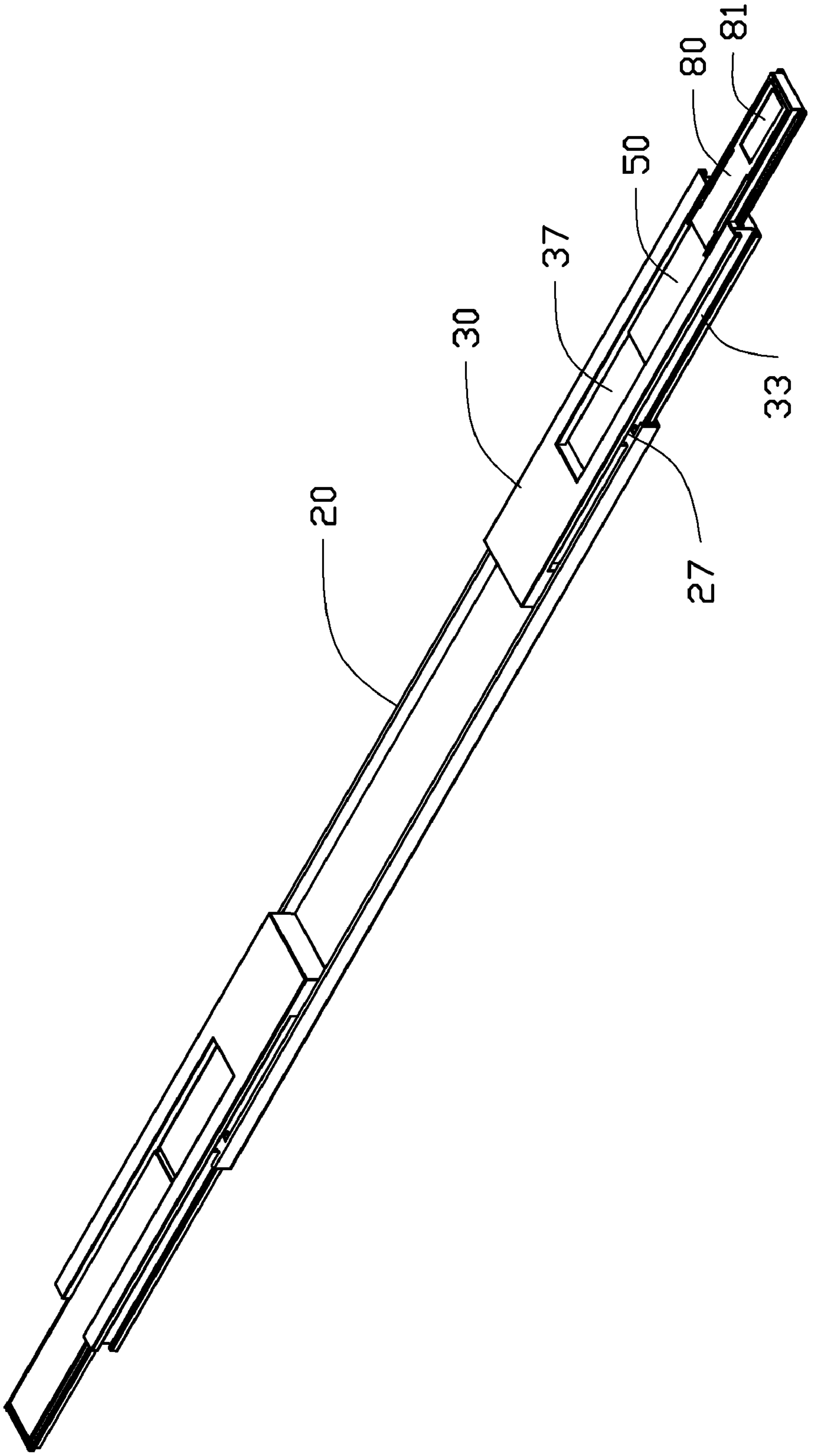
FIG. 7 is similar to FIG. 6, but shows the first and second support members in another different position.
Figure 8:
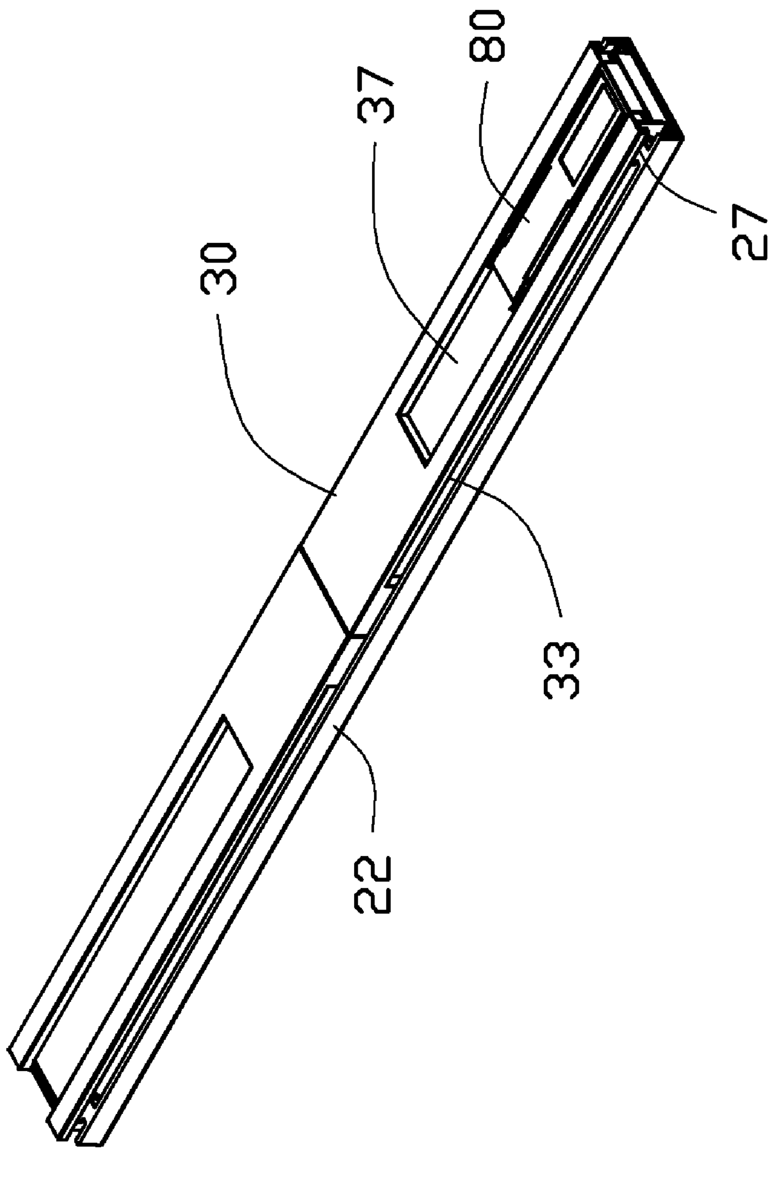
FIG. 8 is similar to FIG. 7, but shows the first and second support members in yet another different position.

Referring to FIG. 4, a display 10 includes a top wall 11 and two opposite sidewalls 13. The sidewalls 13 are substantially perpendicular to the top wall 11. In one embodiment, the display may be a liquid crystal display.

Referring to FIGS. 1-5, the case 20 is secured to the top wall 11 of the display 10. A portion of each first sliding member 30 is slid out of the case 20. A portion of each second sliding member 50 is slid out of the first sliding slot 37 of each first sliding member 30, until the pivot portions 53 of each second sliding member 50 are substantially aligned with each sidewall 13 of the display 10. Each first supporting member 70 is rotated to a vertical position. In one embodiment, each first supporting member 70 abuts on each sidewall 13 of the corresponding sliding member 30. Each second supporting member 80 is rotated to a horizontal position. Two speakers 100 are positioned in the recess 81 and supported on the second supporting members 80 and are thus secured to the display 10.

Referring also to FIGS. 5-8, when the speakers 100 are removed from the second supporting members 80, the second supporting members 80 are rotated in the spaces 73 of the first supporting members 70. The first and second supporting members 70, 80 and the connecting members 90 are together rotated to position on the second sliding members 50. The second sliding members 50 are slid into the first sliding slots 37 of the first sliding members 30. Then the first sliding members 30 are slid into the case 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising: a case secured to a display; a first sliding member slidably received in the case; and a second sliding member slidably received in the first sliding member; a first supporting member rotatably connected to the second sliding member; and a second supporting member rotatably connected to the first supporting member and positioning a speaker; wherein the first supporting member defines a space that receives the second supporting member; and wherein a connecting member is rotatably connected between the first and second supporting members.

2. The mounting apparatus of claim 1, wherein the case comprises two sidewalls; a positioning post is located on each sidewall; and the first sliding member defines two second sliding slots that slidably receives the two positioning posts.

3. The mounting apparatus of claim 2, wherein each positioning post comprises a neck and a head connected to the neck, wherein the head has a diameter greater than that of the neck; two limiting flanges are located on opposite edges of each second sliding slot; the necks of the positioning posts are positioned between the limiting flanges; and the heads of the positioning posts are blocked by the limiting flanges in the second sliding slot.

4. The mounting apparatus of claim 1, wherein the first sliding member defines a first sliding slot receiving the second sliding member.

5. The mounting apparatus of claim 4, wherein two positioning flanges are located on opposite edges of the first sliding slot; and the second sliding member is blocked by the two positioning flanges in the first sliding slot.

6. The mounting apparatus of claim 1, wherein the second supporting member defines a recess for receiving the speaker.

7. A mounting apparatus comprising: a display; a case secured to the display; a sliding mechanism slidably received in the case; and a supporting mechanism rotatably connected to the sliding mechanism and positioning a speaker; wherein the sliding mechanism comprises a first sliding member and a second sliding member; and the first sliding member defines a first sliding slot that receives the second sliding member; wherein the supporting mechanism comprises a first supporting member and a second supporting member rotatably connected to the first supporting member; the first supporting member defines a space that receives the second supporting member; and wherein a connecting member is rotatably connected between the first and second supporting members.

8. The mounting apparatus of claim 7, wherein the case comprises two sidewalls; a positioning post is located on each sidewall; the sliding mechanism comprises a first sliding member; and the first sliding member defines two second sliding slots that slidably receives the two positioning posts.

9. The mounting apparatus of claim 8, wherein each positioning post comprises a neck and a head connected to the neck; the head has a diameter greater than that of the neck; two limiting flanges are located on opposite edges of each second sliding slot; the necks of the positioning posts are positioned between the limiting flanges; and the heads of the positioning posts are blocked by the limiting flanges in the second sliding slot.

10. The mounting apparatus of claim 7, wherein two positioning flanges are located on opposite edges of the first sliding slot; and the second sliding member is blocked by the two positioning flanges in the first sliding slot.

11. The mounting apparatus of claim 7, wherein the second supporting member defines a recess for receiving the speaker.

12. A mounting apparatus comprising: a case secured to a display; a sliding mechanism connected to the case; and a supporting mechanism connected to the sliding mechanism and positioning a speaker; wherein the sliding mechanism and the supporting mechanism has a first position, where the sliding mechanism and the supporting mechanism are received in the case, and a second position, where the sliding mechanism is slid to expose out of the case and the supporting mechanism is rotated relative to the sliding mechanism for positioning a speaker; wherein the supporting mechanism comprises a first supporting member and a second supporting member rotatably connected to the first supporting member; the first supporting member defines a space that receives the second supporting member; and a connecting member is rotatably connected between the first and second supporting members; and wherein the sliding mechanism comprises a first sliding member slidably received in the case; and a second sliding member slidably received in the first sliding member.

13. The mounting apparatus of claim 12, wherein the case comprises two sidewalls; a positioning post is located on each sidewall; the sliding mechanism comprises a first sliding member; and the first sliding member defines two second sliding slots that slidably receives the two positioning posts.

14. The mounting apparatus of claim 13, wherein each positioning post comprises a neck and a head connected to the neck; the head has a diameter greater than that of the neck; two limiting flanges are located on opposite edges of each second sliding slot; the necks of the positioning posts are positioned between the limiting flanges; and the heads of the positioning posts are blocked by the limiting flanges in the second sliding slot.

* * * * *